US009116930B2

(12) United States Patent  
Arsenault et al.

(10) Patent No.: US 9,116,930 B2
(45) Date of Patent: Aug. 25, 2015

(54) METHOD AND SYSTEM FOR CONFIGURING A CONTACT DATABASE ASSOCIATED WITH A USER

(71) Applicant: BCE INC., Verdun (CA)

(72) Inventors: Jonathan Allan Arsenault, Orleans (CA); Nathan Gerald Archer, Russell (CA); Eric John Wolf, Stittsville (CA)

(73) Assignee: BCE Inc., Montreal (CA)

( * ) Notice: Subject to any disclaimer, the term of this patent is extended or adjusted under 35 U.S.C. 154(b) by 33 days.

(21) Appl. No.: 14/154,697

(22) Filed: Jan. 14, 2014

(65) Prior Publication Data

US 2014/0129516 A1 May 8, 2014

Related U.S. Application Data

(63) Continuation of application No. 12/654,574, filed on Dec. 23, 2009, now Pat. No. 8,660,257.

(30) Foreign Application Priority Data

Dec. 24, 2008 (CA) ...................................... 2647921

(51) Int. Cl.
*H04M 5/00* (2006.01)
*H04M 1/64* (2006.01)
*G06F 17/30* (2006.01)
*H04M 15/06* (2006.01)

(52) U.S. Cl.
CPC ......... *G06F 17/30289* (2013.01); *H04M 15/06* (2013.01)

(58) Field of Classification Search
CPC combination set(s) only.
See application file for complete search history.

(56) References Cited

U.S. PATENT DOCUMENTS

| 6,680,935 | B1 | 1/2004 | Kung et al. |
| 6,744,759 | B1 | 6/2004 | Sidhu et al. |
| 6,950,402 | B2 | 9/2005 | Mishra |
| 7,076,042 | B1 | 7/2006 | Praturi et al. |
| 7,672,931 | B2 | 3/2010 | Hurst-Hiller et al. |
| 7,751,533 | B2 | 7/2010 | Makela |
| 7,921,165 | B2 | 4/2011 | Pearson et al. |
| 7,953,552 | B2 | 5/2011 | Severson |
| 8,060,555 | B2 | 11/2011 | Grayson et al. |
| 8,086,676 | B2 | 12/2011 | Palahnuk et al. |
| 8,086,842 | B2 | 12/2011 | Sidhu et al. |
| 8,131,460 | B2 | 3/2012 | Severson |
| 8,150,422 | B2 | 4/2012 | Eldering |
| 8,161,419 | B2 | 4/2012 | Palahnuk et al. |
| 8,166,113 | B2 | 4/2012 | Costea et al. |

(Continued)

OTHER PUBLICATIONS

International Search Report mailed on Sep. 20, 2007 in connection with International Patent Application PCT/CA2006/002116, 3 pages.

(Continued)

*Primary Examiner* — Joseph T Phan
(74) *Attorney, Agent, or Firm* — Gowling Lafleur Henderson LLP

(57) ABSTRACT

A method implemented by a network entity that comprises identifying contact information associated with a previously-originated call, receiving from a user information indicative of a desired modification to a database associated with the user, wherein the desired modification involves the contact information associated with the previously-originated call. The method further comprises configuring the database associated with the user at least in part on the basis of the desired modification and the contact information associated with the previously-originated call.

41 Claims, 7 Drawing Sheets

(56) References Cited

U.S. PATENT DOCUMENTS

| | | | |
|---|---|---|---|
| 8,190,119 | B2 | 5/2012 | Jabara et al. |
| 8,234,244 | B2 | 7/2012 | Eldering et al. |
| 8,239,853 | B2 | 8/2012 | Lee |
| 8,249,995 | B2 | 8/2012 | Sheperd |
| 8,275,367 | B1 | 9/2012 | Gilbert et al. |
| 2005/0157858 | A1 | 7/2005 | Rajagopalan et al. |
| 2005/0180393 | A1 | 8/2005 | Skubisz |
| 2006/0193453 | A1 | 8/2006 | Price |
| 2007/0038720 | A1 | 2/2007 | Reding et al. |
| 2008/0222127 | A1 | 9/2008 | Bergin |

OTHER PUBLICATIONS

Written Opinion of the International Searching Authortiy mailed on Sep. 20, 2007 in connection with International Patent Application PCT/CA2006/002116, 5 pages.

Examiner's Report issued Apr. 10, 2012 in connection with Canadian Patent Application 2,647,921, 2 pages.

Non-Final Office Action issued on Oct. 9, 2012 in connection with U.S. Appl. No. 12/654,574, 8 pages.

Non-Final Office Action issued on Nov. 20, 2012 in connection with U.S. Appl. No. 11/993,679, 10 pages.

Final Office Action issued on May 23, 2013 in connection with U.S. Appl. No. 11/993,679, 10 pages.

Final Office Action issued on Jun. 6, 2013 in connection with U.S. Appl. No. 12/654,574, 8 pages.

Notice of Allowance issued on Oct. 11, 2013 in connection with U.S. Appl. No. 12/654,574, 9 pages.

Ditech Networks, "SBC with Far-end NAT Traversal, Inter-Carrier Peering, and Security", http://www.ditechnetworks.com/platforms/productdetail.aspx?pid=41, Dec. 22, 2009.

Office Action issued on Mar. 26, 2014 in connection with U.S. Appl. No. 11/993,679—10 Pages.

METHOD AND SYSTEM FOR CONFIGURING A CONTACT DATABASE ASSOCIATED WITH A USER

CROSS REFERENCE TO RELATED APPLICATIONS

This application is a continuation of U.S. patent application Ser. No. 12/654,574, filed on Dec. 23, 2009. This application also claims the benefit under 35 USC 119(a) from Canadian Patent Application No. 2,647,921, entitled "Method and System for Configuring a Contact Database Associated with a User" filed in the Canadian Patent Office on Dec. 24, 2008. The contents of the aforementioned documents are incorporated herein by reference.

FIELD OF THE INVENTION

The present invention relates generally to telephonic communications and, more particularly, to a method and system for configuring a contact database associated with a user on the basis of contact information associated with a previously-originated call.

BACKGROUND

Many people who use network telephony devices, such as cell phones and smart phones, are associated with a contact database (which can also be referred to as an electronic address book) in which contact information associated with their contacts is stored. This contact database can be stored locally within the telephony device, or can be located within a network, such that the size of the network address book is not limited by the memory space within the cell phone. Likewise, not all a user's contact information is lost if the cell phone gets lost or damaged.

Typically, in order for a user to add contact information to his or her contact database (whether located locally or on a network), the user must manually enter the contact information (such as the contact's name, phone number, fax number, address, etc. . . . ) and then indicate that it should be stored to their contact database. This can be both time consuming and inconvenient for a user.

Thus, there remains a need in the industry to provide a technological solution that alleviates, at least in part, some of the deficiencies associated with the manner in which contact information is entered and a user's contact database.

SUMMARY OF THE INVENTION

As embodied and broadly described herein, the invention provides a method implemented by a network entity. The method comprises identifying contact information associated with a previously-originated call and receiving from a user information indicative of a desired modification to a database associated with the user. The desired modification involves the contact information associated with the previously-originated call. The method further comprises configuring the database associated with the user at least in part on the basis of the desired modification and the contact information associated with the previously-originated call.

The invention also provides a network configuration entity. The network configuration entity comprises a communication unit and a configuration unit. The communication unit is operative for identifying contact information associated with a previously-originated call and receiving from a user information indicative of a desired modification to a database associated with the user. The desired modification involves the contact information associated with the previously-originated call. The configuration unit is operative for causing a database associated with the user to be configured at least in part on the basis of the desired modification and the contact information associated with the previously-originated call.

The invention also provides a system. The system comprises a database associated with a user and a network configuration entity. The database includes a set of records that each comprise contact information associated with a respective contactable entity. The network configuration entity is operative for identifying contact information associated with a previously-originated call to the user, receiving information from the user indicative of a desired modification to a database associated with the user. The desired modification involves the contact information associated with the previously-originated call, and causing the database associated with the user to be configured at least in part on the basis of the desired modification and the contact information associated with the previously-originated call.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of certain embodiments of the invention is provided herein below, by way of example only, with reference to the accompanying drawings, in which.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
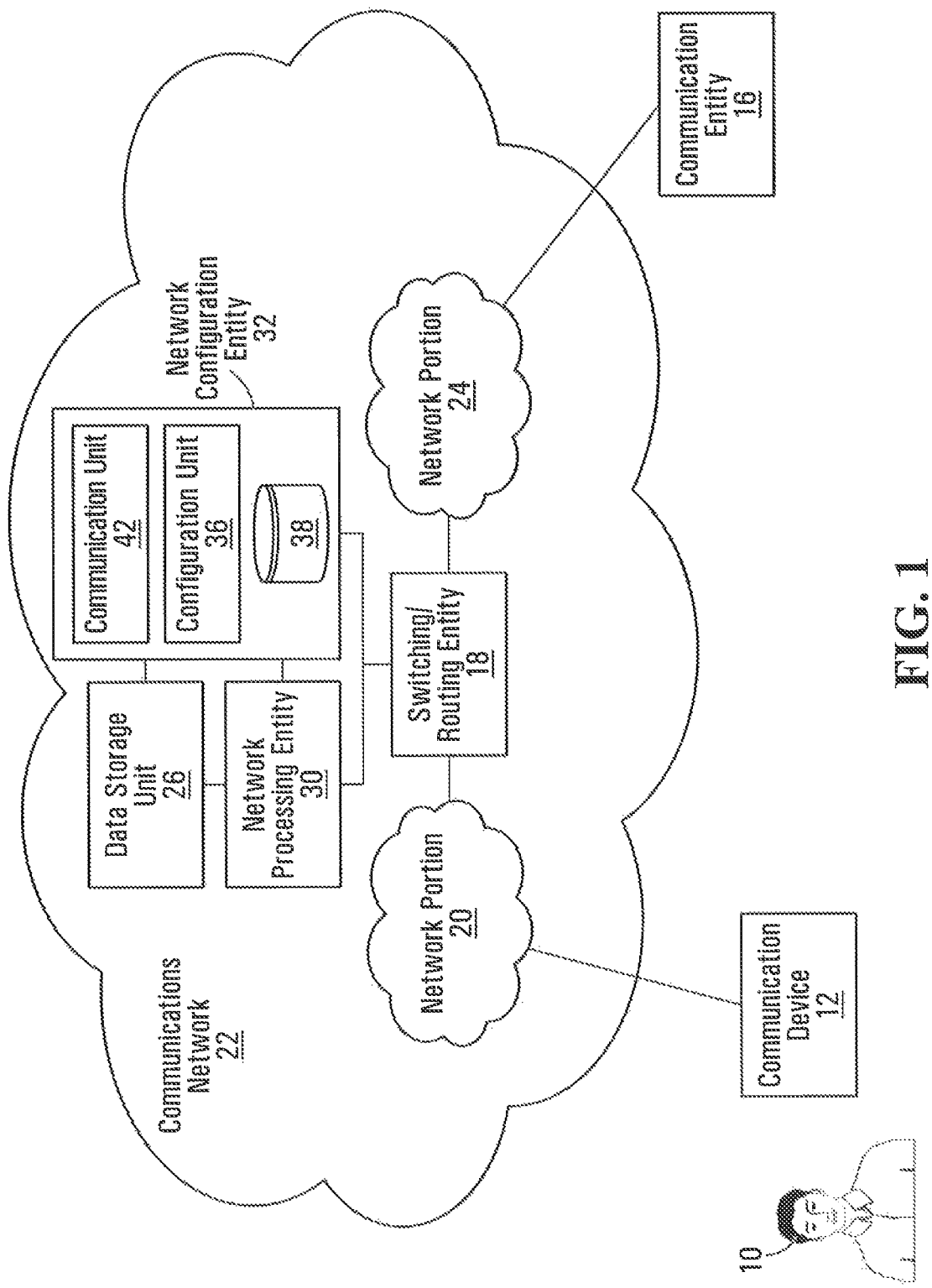
FIG. 1 illustrates a non-limiting example of a communications network comprising a network configuration entity that enables configuration of a database associated with a user at least in part on the basis of contact information associated with a previously-originated call.

FIG. 1 depicts a communication device 12 that may be employed by a user 10 to effect telephonic communications, including handling an incoming call originating from a calling party device, originating an outgoing call destined for a called party device, and participating in a call in progress. For example, in various embodiments, the communication device 12 may be a wired Plain Old Telephony System (POTS) phone (including a cordless phone), a wireless phone (e.g., a cellular phone or other mobile communication device including a telephony-enabled personal digital assistant (PDA)), a Voice-over-Internet Protocol (VoIP) phone, a POTS phone equipped with an analog terminal adapter (ATA), a soft phone (i.e., a computer equipped with telephony software), or a telephony-enabled television (TV) unit (e.g., a set-top box connected to a television and a remote control). Depending on the functionality of the communication device 12, a call originated by, destined for, or in progress at the communication device 12 may be a voice call, a video call, a multimedia call, or any other type of call.

The communication device 12 is connected to a switching/routing entity 18 via a first network portion 20 of a communications network 22. The switching/routing entity 18 enables the communication device 12 to reach or be reached by any of various communication entities, one of which is represented as reference number 16 (other communication entities are not shown for the sake of simplicity). For example, in possible scenarios, the communication entity 16 may be a telephone (e.g., a wired POTS, wireless, VoIP, or soft phone), a telephony-enabled TV unit, or a voicemail system. The communication entity 16 is connected to the switching/routing entity 18 via a second network portion 24 of the communications network 22.

The communications network 22 may comprise a portion of one or more of the Public Switched Telephone Network (PSTN), a wireless network (e.g., a cellular network), and a data network (e.g., the Internet).

The nature of the first network portion 20 and the switching/routing entity 18 will depend on the nature of the communication device 12 and where the switching/routing entity 18 resides in the communications network 22. For example, where the communication device 12 is a wired POTS phone and the switching/routing entity 18 resides in the PSTN, the first network portion 20 may comprise a telephone line in the PSTN and the switching/routing entity 18 may be part of a central office switch. In another example, where the communication device 12 is a wireless phone and the switching/routing entity 18 resides in a wireless network, the first network portion 20 may comprise a wireless link in combination with a base station and a network-side wireline link, and the switching/routing entity 18 may be part of a mobile switching center. In yet another example, where the communication device 12 is a VoIP phone (or a POTS phone equipped with an ATA) and the switching/routing entity 18 resides in a data network, the first network portion 20 may comprise a digital communications link (e.g., Ethernet) and the switching/routing, entity 18 may be part of a router (e.g., an edge router or a core router) or a softswitch. In yet another example, where the communication device 12 is a soft phone, the first network portion 20 may comprise a digital communications link (e.g., a digital subscriber line (DSL) link or a coaxial cable) and the switching/routing entity 18 may be part of a server equipped with a modem. It will be appreciated that various other implementations of the first network portion 20 and the switching/routing entity 18 are possible (e.g., where the communication device 12 is a telephony-enabled TV unit). It will also be appreciated that the first network portion 20 may span across different networks (i.e., PSTN, wireless, and/or data) in which case it may comprise one or more gateways enabling communication and interoperability between these networks. Such gateways are well known to those skilled in the art and need not be described in further detail.

Similarly, the nature of the second network portion 24 will depend on the nature of the communication entity 16 and where the switching/routing entity 18 resides in the communications network 22. Thus, like the first network portion 20, the second network portion 24 may comprise, for example, one or more of a telephone line in the PSTN, a wireless link in combination with a base station and a network-side wireline link, a digital communications link, and one or more gateways enabling communication and interoperability between different networks.

The switching/routing entity 18 is operative to effect switching/routing operations to help route an outgoing call originated at the communication device 12 and destined for a called party device (such as the communication entity 16). In addition, the switching/routing entity 18 is operative to effect switching/routing operations to help route an incoming call originated at a calling party device (such as the communication entity 16) and destined for the communication device 12. Furthermore, the switching/routing entity 18 is communicatively coupled to a network processing entity 30, which is described later on, and interacts therewith when the communication device 12 originates an outgoing call, handles an incoming call, or participates in a call in progress. The switching/routing entity 18 comprises suitable hardware, firmware, software, control logic, or a combination thereof for implementing its functionality.

In accordance with the present invention, the network processing entity 30 is communicatively coupled to a data storage entity 26 and a network configuration entity 32. As contemplated herein, the network configuration entity 32 together with the network processing entity 30 is operative for enabling a given party to configure a database associated with the given party on the basis of contact information associated with a previously-originated call. In accordance with a non-limiting embodiment the database associated with the given party can be stored within the communications network 22, at the data storage entity 26, for example. In the embodiment shown, the network processing entity 30 and the data storage unit 26 are connected to the switching routing entity 18. It should be appreciated that in other embodiments, this may not be the case, since it is possible for the network processing entity 30, and the data storage unit 26 to be connected anywhere within communications network 22 without sacrificing functionality, so long as they had the required information.

Figure 2:
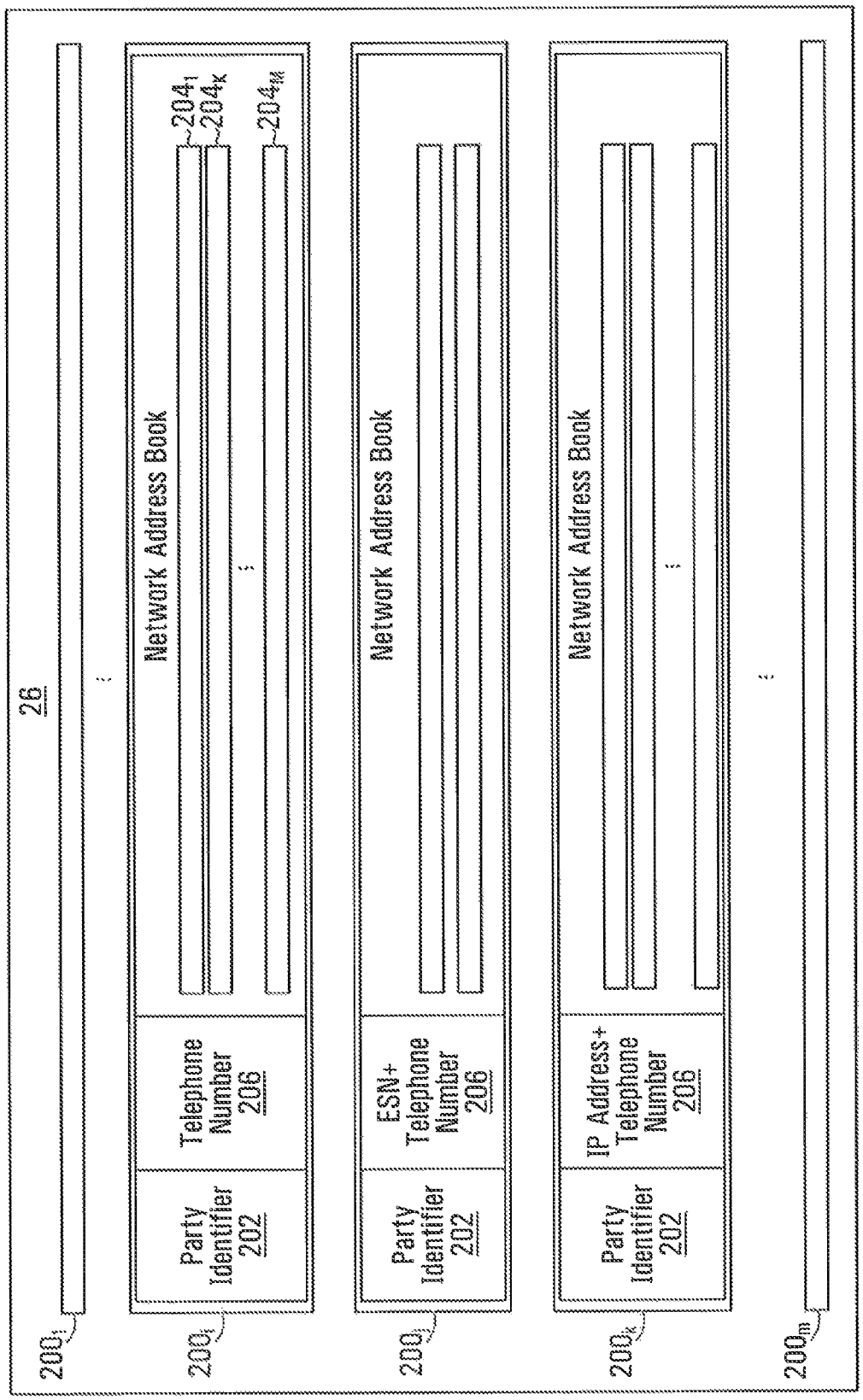
FIG. 2 illustrates a non-limiting example of potential contents of a data storage unit shown in FIG. 1.

FIG. 2 shows an example of potential contents of the data storage entity 26. In this example, the data storage entity 26 stores a plurality of databases $200_1$-$200_M$ each associated with a respective party (such as the user 10) which may be a potential calling party as well as a potential called party. In this non-limiting example, each database $200_{1-M}$ stores an association between party identifier information 202 and a plurality of address book entries $204_{1-M}$. The party identifier information 202 may include a name of the given party associated with the database, a contract number or any other unique identifier for identifying the given party associated with the given database. In addition, the party identifier information 202 may include additional information associated with the given party, such as an address, an email address or any other possible contact information associated with the given party. Each of the address book entries $204_{1-M}$ stores contact information associated with one of the given party's contacts. For example, the entries $204_{1-M}$ may include a name, a home phone number, a cellular phone number, a work phone number, a fax number, one or more email addresses, a residential address, a work address, or any other potentially relevant contact information associated with one of the given party's contacts. As such, each database $200_1$-$200_m$ can be considered as a network address book associated with a given party, that stores contact information $204_{1-M}$ for different contacts associated with that party.

In the non-limiting embodiment shown, each of the databases $200_1$-$200_m$, further includes network identifier information 206 associated with the given party. The contact information 206 can be information associated with one or more communication devices associated with the given party. For example, database $200_i$ stores an association between the party identifier 202 and a telephone number associated with a phone expected to be used by the party associated with database $200_i$. The database $200_j$ stores an association between a party identifier 202 and an electronic serial number (ESN) and telephone number that are associated with a wireless phone expected to be used by the party associated with database $200_j$. And, the record $200_k$ stores an association between a party identifier 202 and an IP address and telephone number (and/or another Uniform Resource identifier (URI) such as a Session Initiation Protocol (SIP) URI) that are associated with a VoIP phone, ATA equipped POTS phone, or softphone expected to be used by the party associated with database $200_k$. It will be recognized that other forms of content are possible for storage in each of the databases $200_1$-$200_m$. Moreover, it should be appreciated that the contents and format of the databases $200_1$-$200_m$ described above are for illustrative purposes only, and could take on a variety of different implementations that would be apparent to a person of skill in the art.

Although not shown, each of the databases $200_1$-$200_m$ in the data storage entity 26 may also include call processing information associated with the network identifier information 206. This call processing information indicates how calls involving the given party, i.e., calls originated by or destined for a communication device associated with the network identifier information, are to be processed by the network processing entity 30. This call processing information can be configurable in order to cause calls involving the given party to be processed in the manner desired by the given party.

The call processing information associated with a given party can take on many forms. For example, the call processing information associated with a given party may comprise information indicative of whether the party subscribes to one or more telephony features, as well as information regarding each of such one or more telephony features. This telephony feature information is used during processing of calls by the network processing entity 30 in order to apply any telephony feature subscribed to by the respective party as intended by the respective party. Subscription to different telephony features may be completely independent from one party to another and there is no restriction on a number or combination of features that may be subscribed to by any one party. In some cases, a party may not subscribe to any telephony feature, while in other cases a party may subscribe to all available telephony features.

Examples of available telephony features include:
a call forwarding feature;
a selective call forwarding feature;
a no-answer call forwarding feature;
a "find me/follow me" (FM/FM) call forwarding feature;
a first distinctive ringing feature;
a second distinctive ringing feature;
a selective call rejection feature;
a selective call acceptance feature;
a call waiting feature;
a distinctive ringing call waiting feature;
a calling line identification (CLID) displaying feature;
a TV CLID displaying feature;
a CLID blocking feature;
a speed calling feature; and
an outgoing call barring feature.

These telephony features are well understood by persons skilled in the art, and as such will not be described in more detail herein. It is to be understood that these examples of telephony features are presented for illustrative purposes only and are not to be considered limiting in any respect as various other telephony features are or may become available.

In accordance with an embodiment of the present invention, each of the databases $200_1$-$200_m$ stores information on whether a particular party subscribes to an "address book configuration" feature. As further detailed later on, this "address book configuration" feature allows a user to conveniently and efficiently effect configuration of the entries $204_1$-$204_M$ contained within the user's database, at least in part on the basis of contact information associated with a previously-originated call involving the user. For example, when a user is (or has been) involved in a previously-originated call from a third party, the user may use the "address book configuration" feature in order to quickly and easily add, remove or edit contact information associated with that third party in the user's contact database.

In order to benefit from the address book configuration feature, the parties associated with the databases $200_1$-$200_m$ should subscribe to this configuration feature. However, it is to be understood that in other embodiments, all parties may benefit from the address book configuration feature contemplated herein without needing to subscribe thereto, in which case each database $200_1$-$200_m$ may not include information on whether a particular party subscribes to the configuration feature, since this feature will be implemented by the network processing entity 30 automatically.

With renewed reference to FIG. 1, the call processing entity 30 is operative to interact with the switching/routing entity 18 and the data storage unit 26 in order to effect various call processing operations when a communication device (such as the communication device 12) connected to the switching/routing entity 18 is destined to receive an incoming call, originates an outgoing call, or participates in a call in progress.

More particularly, the network processing entity 30 is operative to process calls arriving at the switching/routing entity 18. Processing of a given call by the network processing entity 30 can be viewed as the network processing entity 30 performing one or more operations to process the given call. In this embodiment, the network processing entity 30 is operative to process calls in accordance with a set of rules. Each rule may be defined by a condition, an operation to be performed if the condition is satisfied for a given call, and an operation to be performed if the condition is not satisfied for a given call (e.g., <condition> <operation to be performed if condition is satisfied> <operation to be performed if condition is not satisfied>). For a given rule, the condition may be defined in terms of one or more characteristics of a call. Examples of characteristics of a call are: its origin, which may be expressed, for instance, as a telephone number or other identifier (e.g., an IP address or SIP URI) associated with a device that originated the call; its intended destination, which may be expressed, for instance, as a telephone number or other identifier (e.g., an IP address or SIP URI) associated with a device for which the call is destined; and a time at which it was originated (e.g., a date, hour, minute, etc.). For a given rule, the condition may also be defined in terms of call processing information (in this case, telephony feature information) that may be included in the databases $200_1$-$200_m$ of the data storage unit 26. For a given rule, the operations to be performed based on whether the condition is satisfied depends on the nature of the given rule (e.g., route a call to its intended destination, forward a call in accordance with a call forwarding feature, cause production of an audio signal in accordance with a distinctive ringing feature, prevent establishment of an outgoing call in accordance with an outgoing call barring feature, etc.). The network processing entity 30 comprises suitable hardware, firmware, software, control logic, or a combination thereof for implementing its functionality.

Continuing with FIG. 1, in accordance with an embodiment of the present invention, a network configuration entity 32 associated with the address book configuration feature contemplated herein is communicatively coupled to the switching/routing entity 18, the network processing entity 30, and the data storage unit 26. As further detailed later on, the network configuration entity 32 enables a given party to conveniently and efficiently effect configuration of the entries $204_{1-M}$ contained within one of the databases $200_1$-$200_m$ that is associated with the given party, at least in part on a basis of contact information associated with one or more previously-originated calls involving the given party (i.e., a call that has been previously-originated by a communication device associated with the given party or that has been previously originated by a communication device associated with another party and destined for a communication device associated with the given party). This in effect allows a given party to provide information indicative of a desired modification to their associated database, the modification involving contact information associated with a previously-originated call. The network configuration entity 32 comprises suitable hardware, firmware, software, control logic, or a combination thereof for implementing a plurality of functional units, including a communication unit 42, a configuration unit 36 and a memory unit 38. The functionality of each of these components will be described in more detail further below.

In some embodiments, the switching/routing entity 18, the network processing entity 30, the data storage unit 26, and the network configuration entity 32 may reside in a common network element of the communications network 22. In such embodiments, links between these components may be physical (i.e., wired or wireless) links or logical links. In other embodiments, different ones of the switching/routing entity 18, the network processing entity 30, the data storage unit 26, and the network configuration entity 32 may reside in different network elements of the communications network 22 that are interconnected via one or more physical links and possibly other elements (e.g., gateways) of the communications network 22. Also, although it is depicted in FIGS. 1 and 2 as being one component, the data storage unit 26 may be distributed in nature, i.e., it can have portions of its content stored in different memory units possibly located in different network elements of the communications network 22. For example, the network address book entries $204_1$-$204_M$ shown in FIG. 2 may be stored in a memory unit dedicated to storing this information and distinct from a memory unit that stores the call processing information.

For illustrative purposes, it is assumed that the user 10 associated with the communication device 12 subscribes to the "address book configuration" feature contemplated herein. Under this assumption, interaction between the switching/routing entity 18, the network processing entity 30, the data storage unit 26, and, in particular, the network configuration entity 32 will now be described in the context of an example in which a call previously-originated by the communication entity 16 arrives at the switching/routing entity 18 and will ultimately reach the communication device 12. In describing this example, this call will sometimes be referred to as "the previously-originated call".

Although the term "previously-originated call" is used herein, it should be appreciated that this could also apply to an SMS message, a voice message or any other type of telephony communication that can be handled by the switching/routing entity 18 and the network processing entity 30.

Upon arrival of the previously-originated call at the switching/routing entity 18, the network processing entity 30 detects the call and processes it. As part of this process, the network processing entity 30 determines, based on destination information accompanying the call (e.g., a destination telephone number, ESN, IP address, etc), that the call is destined for the communication device 12 or possibly another communication device associated with the user 10.

In this embodiment, the network processing entity 30 processes the previously-originated call in accordance with the aforementioned set of rules. It is recalled that, in this example, the user 10 subscribes to the address book configuration feature contemplated herein. Thus, the network processing entity 30 uses address book configuration feature information associated with the user 10 in order to process the previously-originated call.

Knowing that the user 10 subscribes to the address book configuration feature contemplated herein, the network processing entity 30 causes the network configuration entity 32 to keep a record of the previously-originated call as the previously-originated call is being processed. More particularly, in this embodiment, the network configuration entity 32 creates in the memory unit 38 a record associated with the previously-originated call and including information regarding contact information associated with that previously-originated call. It will be appreciated that, in embodiments where all parties may benefit from the address book configuration feature contemplated herein without needing to subscribe thereto, the network configuration entity 32 may create in the memory unit 38 a record associated with every previously-originated.

Figure 3:
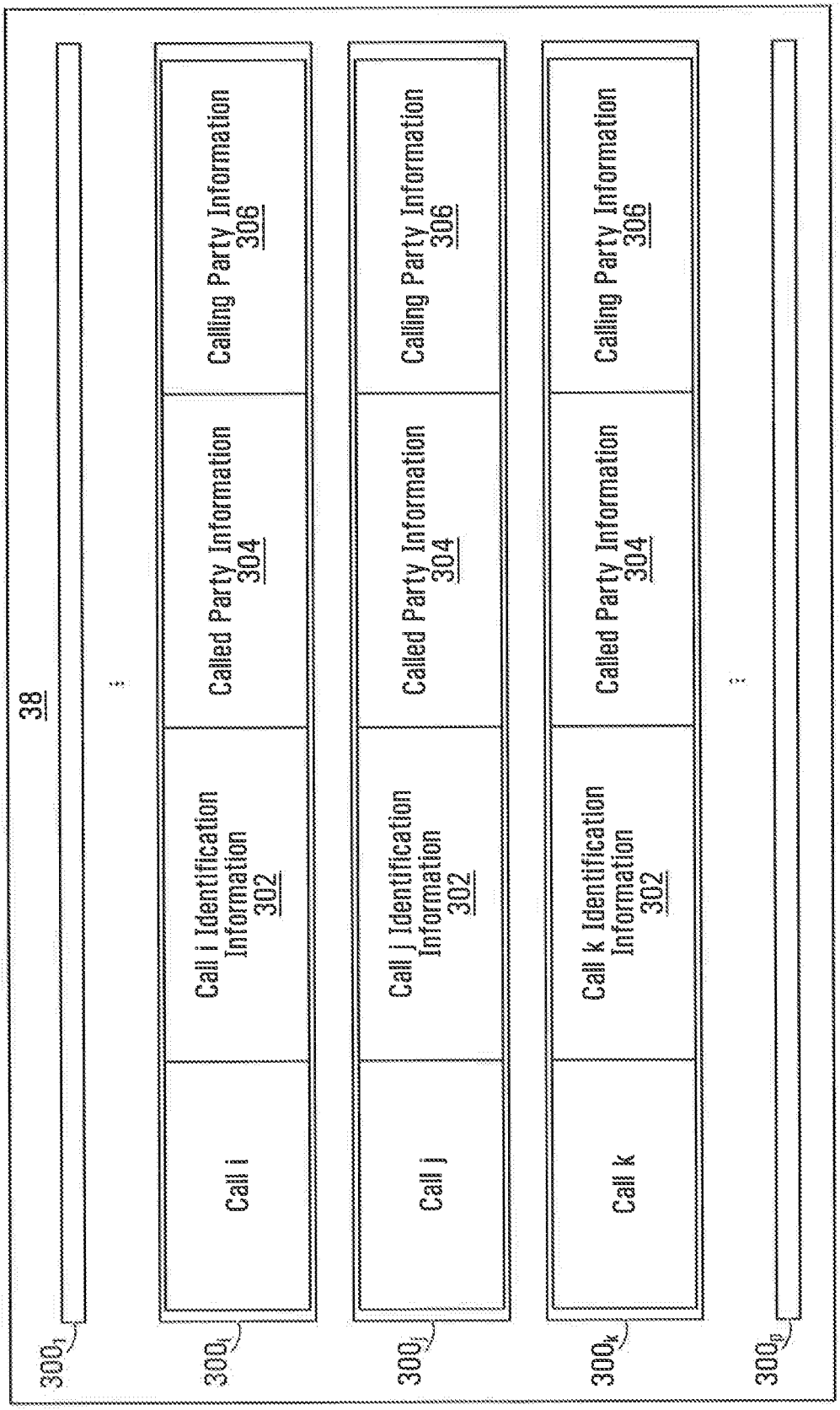
FIG. 3 illustrates an example of potential contents of a memory unit of the network configuration entity shown in FIG. 1.

FIG. 3 shows an example of potential contents of the memory unit 38. In this example, the memory unit 38 stores a plurality of records $300_1$-$300_P$ each associated with a previously-originated call involving a party (such as the user 10) and that has been processed by the network processing entity 30.

Each of the records $300_1$-$300_P$ includes call identification information 302 for identifying the previously-originated call associated with that record. The call identification information can include a time at which that call was originated, and/or other information that uniquely identities that call (e.g., an index, an identification number, an alphanumeric identifier, etc.). For example, a unique identification number can be generated on the basis of a date, time, network identifier of the calling party and network identifier of the called party.

Each of the records $300_1$-$300_P$ further includes called party information 304 and calling party information 306. The called party information 304 may include any information suitable for identifying the called party. For example, the called party information 304 may include a network identifier associated with the communication device that is being called (such as, a telephone number, an ESN, a SIP URI, an IP address, etc). In the case where the called party (such as user 10) subscribes to a calling line identification (CLID) feature, the network processing entity 30 may pass this information to the network configuration entity during the processing of the call. Moreover, even if a user does not subscribe to the CLID feature, the network processing entity 30 may pass CLID-type information to the network configuration entity 32 without the user knowing. In such a case, the called party information 304 may further include the CLID information associated with the called party. In addition, in certain cases where the network processing entity 30 has access to additional contact information associated with the called party, such as in a subscriber application profile, or in the party identifier information 202 stored in one of the databases $200_{1-M}$, it is possible for the network processing entity 30 to send this contact information to the network configuration entity 32 such that it can be included in the called party information 304 associated with the call in progress.

The calling party information 306 may include any information suitable for identifying the calling party. For example, the calling party information 306 may include a network identifier associated with the communication device that is being used to originate the call (which can be a telephone number, an ESN, a SIP URI, an IP address, etc). In the case where the calling party (such as communication entity 16) subscribes to a calling line identification (CLID) feature, the calling party information 306 may further include the CLID information associated with the calling party. Moreover, even if the calling party does not subscribe to the CLID feature, the network processing entity 30 may pass CLID-type information to the network configuration entity 32 without the calling party knowing. In addition, in certain cases where the network processing entity 30 has access to contact information associated with the calling party, such as in a subscriber application profile, it is possible for the network processing entity 30 to send this contact information to the network configuration entity 32 such that it can be included in the calling party information 306 associated with the call in progress.

Figure 4:
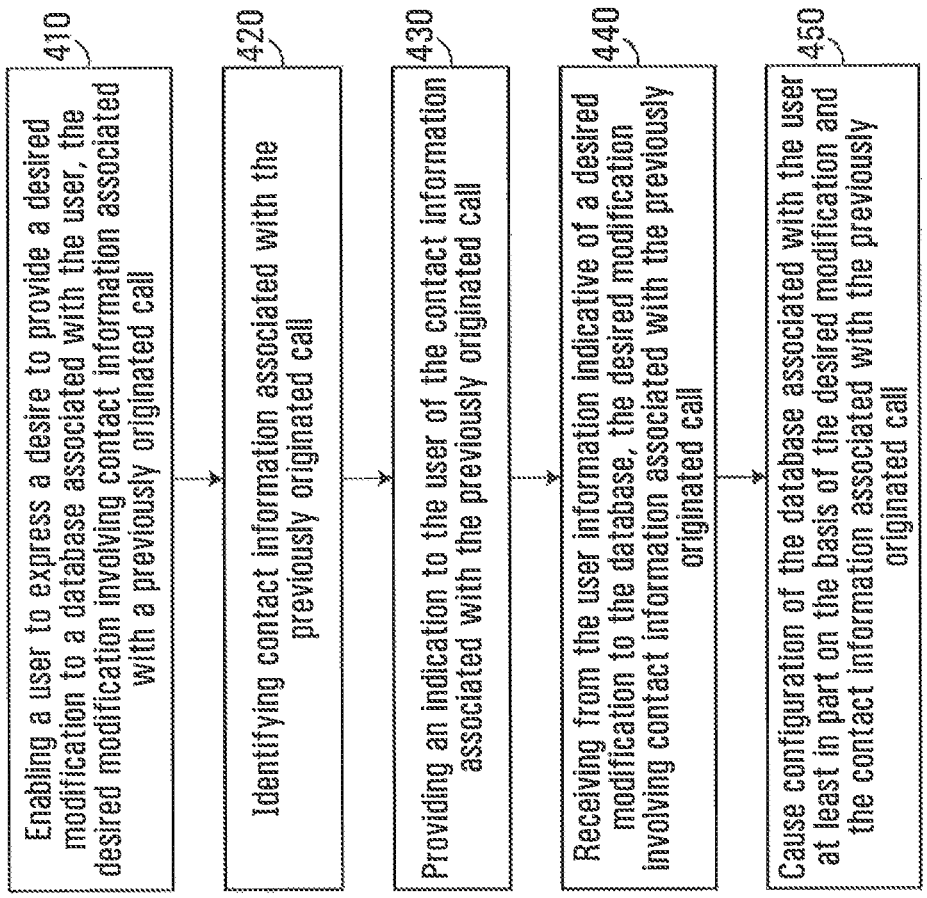
FIG. 4 illustrates a non-limiting example of a process performed by the network configuration entity shown in FIG. 1.

As a result of processing of the previously-originated call by the call processing entity 30, it is assumed, for purposes of this example, that the previously-originated call arrives at the communication device 12. It is further assumed that the call is answered by the user 10 who engages in a conversation with a party (not shown) associated with the communication entity 16. Under this assumption, an example of the "address book configuration" feature, and the operation of the network configuration entity 32 will now be described with additional reference to the flow chart shown in FIG. 4.

Step 410

At step 410, the network configuration entity 32 (and in this case the communication unit 42) enables the user 10 to express a desire to provide information indicative of a desired modification to a database associated with the user 10, wherein the desired modification involves contact information associated with a previously-originated call. For the purposes of this description, the database associated with the user 10 will be referred to as the user's contact database. It should, however, be appreciated that other types of databases could also be modified on the basis of contact information associated with a previously-originated call.

The network configuration entity 32 can enable the user 10 to express this desire to provide information indicative of a desired modification to the user's contact database, at various different times. For example, this desire can be expressed while the previously-originated call is in progress, right after the previously-originated call has ended, or within a given time period after the previously-originated call has ended.

Enabling the user 10 to express a desire to provide information indicative of a desired modification to the user's contact database can be effected in many ways in various embodiments.

In some embodiments, the communication unit 42 may implement an interactive voice response (IVR) module that sends a voice message to the communication device 12. The voice message is suitable for eliciting from the user 10 an indication as to whether he/she desires to provide information indicative of a desired modification to his/her contact database. For example, the IVR module may ask a question such as "Would you like to modify your address book?" or "Would you like to update your address book?", etc. The user 10 may then speak an utterance (e.g., "yes" or "no") conveying an indication as to whether he/she desires to provide information indicative of a desired modification to his/her contact database.

In other embodiments, the communication device 12 (which in this example is the called communication device) may have a display. In such a case, the communication unit 42 may send a signal to the communication device 12 to cause a display of text or other graphical elements eliciting from the user 10 an indication as to whether he/she desires to provide such information. In this manner, the user 10 is enabled to express a desire to provide information indicative of a desired modification to the user's contact database by responding to the display of text or other graphical elements. For example, the textual display may indicate "To modify you address book, press 1." The user 10 may then press on one or more buttons of the communication device 12 or otherwise tactilely interact therewith to cause transmission to the communication unit 42 of a signal conveying an indication as to whether the user 10 desires to provide information indicative of a desired modification to his/her contact database.

In these embodiments, transmission to the communication device 12 of the voice message and/or the signal to cause display of text or other graphical elements may be effected automatically by the communication unit 42 right after the previously originated call ends, without requiring any input from the user 10. This automatic transmission may be effected by the communication unit 42 for any previously-originated call (such as the one under consideration in this example). Alternatively, the communication unit 42 may effect this automatic transmission for a given previously-originated call only when one or more conditions are satisfied. For example, only when the user 10 does not already have an entry $204_{1-M}$ included within his/her contact database for the calling party (in this case communication entity 16) will the communication unit 42 effect this automatic transmission. Obviously, other conditions could also cause this automatic transmission to be issued from the communication unit 42, which will be apparent to persons skilled in the art.

In yet other embodiments, the communication unit 42 may enable the user 10 to express a desire to provide information indicative of a desired modification to his/her contact database, by being attentive to receipt of a signal generated by the communication device 12 and indicative of a desire of the user 10 to provide such information. The user 10 can cause the communication device 12 to generate this signal by speaking one or more utterances and/or by pressing on one or more buttons of the communication device 12 (e.g., to enter an input command such as "*12") or by otherwise tactilely interacting therewith. The user 10 can do this while a previously-originated call is in progress, just after a previously-originated call has ended, or at any other time following the termination of the previously-originated call. In addition, the user can cause this signal to be generated without requiring a prompt (such as a voice signal or textual display) from the communication unit 42 of the network configuration entity 32. For example, the user 10 can decide at any time that he/she would like to cause a signal to be generated at the communication device 12 that expresses the user's desire to provide information indicative of a desired modification to the user's contact database.

For the purposes of this example, it is assumed that the user 10 indeed desires to provide information indicative of a desired modification to his/her contact database. Accordingly, the user 10 expresses this desire by speaking one or more utterances and/or pressing on one or more buttons of the communication device 12 or otherwise tactilely interacting therewith, as the case may be, resulting in transmission to the communication unit 42 of a signal expressing the user's desire to provide information indicative of a desired modification to the user's contact database, wherein the desired modification involves contact information that is associated with a previously-originated call.

Regardless of how the signal is generated, the signal that expresses the user's desire to provide information indicative of a desired modification to the user's contact database, is received at the network configuration entity 32.

Step 420

As mentioned above, the information indicative of a desired modification to the user's contact database involves contact information associated with a previously-originated call. As such, at step 420, upon receipt of the signal expressing the user's desire to provide information indicative of a desired modification to his/her contact database, the communication unit 42 identifies the previously-originated call containing the contact information on the basis of which the desired modification will be made. More specifically, the communication unit 42 identifies the contact information associated with the previously-originated call.

In the case where the user 10 expressed a desire to provide information indicative of a desired modification while the previously-originated call was in progress, the communication unit 42 may identify the previously-originated call in question by virtue of knowing that it is the one that is currently in progress. Alternatively, in the case where the user 10 provides the signal expressing a desire to provide information indicative of a desired modification right after the previously-originated call ended, the communication unit 42 may identify the previously-originated call in question by virtue of knowing that it is the call that just ended. In these two cases, the communication unit 42 may identify the previously-originated call by accessing the memory unit 38 in order to identify the particular one of the records $300_1$-$300_P$ that is associated with the ongoing, or most recent call, associated with the user 10. This identification may be done on the basis of a network identifier associated with the user 10.

In other cases, the communication unit 42 may identify a previously-originated call involving a party on a basis of information enabling identification of that call that is received as a result of interaction with a user (such as user 10), via the user's communication device (such as the communication device 12). This information may comprise a telephone number or other network identifier associated with the called party, a telephone number or other network identifier associated with the calling party, a date and/or an origination time of the previously-originated call, as well as any other information that uniquely identifies the previously-originated call. This information may be received by the communication unit 42 as a result of the user speaking one or more utterances (possibly in response to one or more voice messages (e.g., questions) sent by the communication unit 42) and/or as a result of the user pressing on one or more buttons of his/her communication device or otherwise tactilely interacting therewith. Based on the received information, the communication unit 42 may proceed to access the memory unit 38 in an attempt to locate a particular one of the records $300_1$-$300_P$ that is associated with the previously-originated call, thereby identifying it.

For example, assume that communication entity 16 originated a call destined for communication device 12 yesterday. Assuming that user 10 now wants to be able to access and store contact information associated with communication entity 16, the user 10 may first provide a signal expressing a desire to provide a desired modification to his/her contact database (step 410 described above). At this point, the communication unit 42 may provide voice or text questions, such that the network configuration entity 32 can correctly identify the proper previously-originated call. In response to these questions, the user 10 may provide the date and approximate time of the previously-originated call. On the basis of this information, as well as perhaps the network identifier information (telephone number, SIP URI, ESN, etc.) of the communication device 12 that is interacting with the network configuration entity 32, the network configuration entity 32 can access the memory unit 38 and identify the previously-originated call that the user 10 is looking for.

Once the network configuration entity 32 has correctly identified the previously-originated call, the network configuration entity 32 can then identify the contact information associated with the previously-originated call. This contact information is stored in both the called party information 304 and the calling party information 306 of the record $300_{1-P}$ associated with the identified previously-originated call.

As mentioned above, the contact information stored in the called party information 304 and the calling party information 306 of the previously-originated call, can include information indicative of a network identifier (such as telephone number, SIP URI, ESN, IP Address, etc), CLID information (such as a name or other identifier) as well as any address or other information that could have been retrieved from a subscriber application profile (or from a third party database).

Although step 420 appears in this example as occurring after step 410 wherein the network configuration entity 32 enabled the user 10 to express a desire to provide information indicative of a desired modification to his/her database, it will be appreciated that this step of identifying the previously-originated call, and specifically, identifying contact information associated with the previously-originated call, may occur before or concurrently with the configuring entity 32 enabling the user 10 to express such a desire.

Step 430

Having identified the previously-originated call and the contact information stored within the record associated with the previously-originated call, at step 430 the communication unit 42 then provides the user 10 with an indication of the contact information associated with the previously-originated call. This information enables the user 10 to decide how he/she should configure his/her contact database on the basis of this contact information.

The contact information that is provided to the user 10 may be provided according to a set of rules. For example, given that user 10 is the called party, the communication unit 42 may only provide the user 10 with the contact information associated with the calling party (which in this example is communication entity 16). As such, the communication unit 42 will provide the user 10 with some or all of the contact information contained within the calling party information 306 portion of the given record $300_{1-M}$. This information may include the calling party's name, phone number, fax number, residential address, etc. The rules may further indicate what type of contact information should be provided, and the format in which it should be displayed.

The above example of contact information associated with the previously-originated call is presented for illustrative purposes only and is not to be considered limiting in any respect as it will be appreciated that other types of contact information is possible.

The manner in which the contact information associated with the previously-originated call is provided to the user 10 can be done in a variety of different manners. Where the communication unit 42 implements an IVR module, the communication unit 42 may provide to the user 10 the contact information by sending one or more voice messages to the communication device 12 for conveying the contact information. Where the communication device 12 has a display, the communication unit 42 may provide to the user 10 the contact information associated with the previously-originated call by sending one or more signals to the communication device 12 to cause display of text or other graphical elements that convey the contact information.

The contact information can include some, if not all, of the contact information stored in the calling party information 306 section of the previously-originated call record 300. For example, the contact information can include a name, one or more phone numbers, one or more fax numbers, one or more email addresses, CLID information, residential address information, etc. . . . . .

In the case of a text display, the contact information may appear as follows:
Called you on Dec. 2, 2008 at 9:15 am
John Smith
Ph #: (515) 555-1234
Fax #: (515) 555-2345
Address: 3333 Mount Pleasant Rd, City, Country While it can be beneficial to the user 10 in some cases, this step of providing to the user 10 contact information associated with the previously-originated call is optional and may not be effected in certain embodiments. For example, in some cases, by virtue of his/her participation in a previously-originated call and without being provided with contact information regarding that call, the user 10 may realize that he/she would like to modify his/her contact database on the basis of contact information associated with the other party involved in the previously-originated call.

Step 440

Upon receiving the contact information associated with the previously-originated call, the user 10 may decide that he/she would like to modify his/her contact database on the basis of this contact information. For purposes of this example, it is assumed that the user 10 desires to indicate a desired modification to his/her contact database on the basis of the contact information associated with the previously-originated call.

Accordingly, at step 440, the user 10 interacts with the communication device 12 so as to cause the communication unit 42 to receive information indicative of a desired modification to his/her contact database, the desired modification involving the contact information associated with the previously-originated call.

The following are some non limiting examples of desired modifications to the user's contact database:
1) Add the contact information associated with the previously-originated call to my contact database. A user may desire this modification when he/she does not yet have an entry for this contact (such as John Smith) in his/her contact database;
2) Update the entry in my contact database associated with this contact on the basis of the contact information associated with the previously-originated call. A user may desire this modification when he/she already has an entry in his/her contact database, but some of the contact information is outdated or missing. For example, the contact (such as John Smith) may have gotten a new phone number, or the user may have the contact's phone number, but not residential address.
3) Remove the contact information associated with the previously-originated call from my contact database. A user may desire this modification when he/she no longer wishes to have an entry for this contact (such as John Smith) in his/her contact database.

In embodiments where the communication unit 42 implements an IVR module, an interaction wherein the user provides information indicative of a desired modification to his/her database, may be effected by the user 10 speaking one or more utterances (possibly in response to one or more voice messages (e.g., questions) sent by the communication unit 42) resulting in the communication device 12 transmitting to the communication unit 42 one or more signals conveying the information indicative of the desired modification to his/her contact database. In such embodiments, the communication unit 42 may determine how to modify the user's contact database by applying speech recognition to the one or more signals.

For instance, and continuing with our example that the contact information relates to John Smith, upon receipt of the contact information at step 430, at step 440, the user 10 may speak (possibly in response to one or more voice messages (e.g., questions) sent by the communication unit 42) one or more utterances indicating that the user desires that this contact information be added to his/her contact database. By application of speech recognition to the one or more signals produced by the communication device 12 and conveying the one or more utterances spoken by the user 10, the communication unit 42 is able to determine how to modify the user's contact database.

The above example is presented for illustrative purposes only and is not to be considered limiting in any respect. It is also possible that in response to the user's indication of a desire to add the contact information to his/her contact database, the communication unit 42 may provide one or more additional voice questions in order to further tailor the manner in which the user's contact database will be modified. For example, the communication unit 42 may ask questions such as "Add all contact information?", "Add only name and phone number?" "Add contact to speed dial list?" etc.

In embodiments where the communication device 12 has a display, the user 10 may press on one or more buttons of the communication device 12 or otherwise tactilely interact therewith so as to enter text and/or act on (e.g., select) one or more graphical elements displayed on the display, resulting in the communication device 12 transmitting to the communication unit 42 one or more signals conveying the information indicative of a desired modification to the user's contact database. By processing these one or more signals, the communication unit 42 is able to determine how to modify the user's contact database.

In a further non-limiting example of implementation, steps 410, 420, and 440 may be performed in a different order. For example, once the previously originated call has terminated, the communication unit 42 may provide the user 10 at the communication device 12 with a question such as "would you like to add the party associated with the last phone call to your contact database?". This can be provided via a voice signal, or a text or other type of graphical display. The user 10 can then respond to this prompt, by indicating "yes" or "no". Assuming that the user 10 indicates "yes", then the communication unit 42 receives simultaneously an indication of a desire to modify the user's contact database (step 410) and an indication of how the contact database should be modified (step 440). It may only be at that point that the network configuration entity 32 obtains contact information associated with the previously originated call (step 420). In this embodiment, the step 420 of obtaining the contact information may be done in any of the manners described above. Alternatively, in the case where the configuration unit 36 is unable to obtain contact information, the contact information may be provided by the user. In this manner, the configuration unit 36 may be able to acquire additional information from a user that is not available from the network.

Step 450

Upon receiving from the user the information indicative of a desired modification to the user's contact database, at step 450, the configuration unit 36 uses this received information to cause configuration of the user's contact database (which for the sake of example, will be referred to as database $200_i$ in FIG. 2). This configuration is done at least in part on the basis of the contact information associated with the previously-originated call.

In this embodiment, this configuration may involve modifying, adding and/or deleting one or more entries $204_{1-M}$ contained within the database $200_i$ associated with the user 10.

More particularly, in this embodiment, the database $200_i$ associated with the user 10 is stored in the data storage unit 26 of the communications network 22. Accordingly, in order to cause the configuration of this database $200_i$, the configuration unit 36 interacts with the data storage unit 26, and possible the network processing entity 30, in order to issue signals that will cause the database $200_i$ associated with the user 10 to be accessed and configured in the appropriate manner. This configuration is done on the basis of the contact information associated with a previously-originated call, and on the basis of the information indicative of the desired modification provided by the user 10 in step 440.

In the case where the user 10 provided information indicative that the contact information associated with the previously-originated call should be added to the user's contact database, then the configuration unit 36 configures the user's contact database such that at least some of the contact information associated with the previously-originated call is added as a new entry $204_N$ within the user's contact database (which could be one of the databases $200_1$-$200_m$).

In the case where the user 10 provided information indicative that the contact database should be updated or modified on the basis of the contact information associated with the previously-originated call, then the configuration unit 36 configures the user's contact database such that at least one of the entries $204_{1-M}$ (and most likely the record that already contains information for that contact) is modified and/or updated.

In the case where the user 10 provided information indicative that the contact information associated with the previously-originated call should be removed from the user's contact database, then the configuration unit 36 configures the user's contact database such that some, if not all, of the contact information contained within an entry 204 associated with the contact information from the previously-originated call is removed from the user's contact database.

The above examples of configuration of the user's contact database is presented for illustrative purposes only and is not to be considered limiting in any respect since such configuration depends on what the user 10 indicated should be performed to his/her contact database.

It will thus be appreciated that, in this example, the network configuration entity 32 enabled the user 10 to conveniently and efficiently effect configuration of his/her contact database, on the basis of contact information associated with a previously-originated call.

Figure 5:
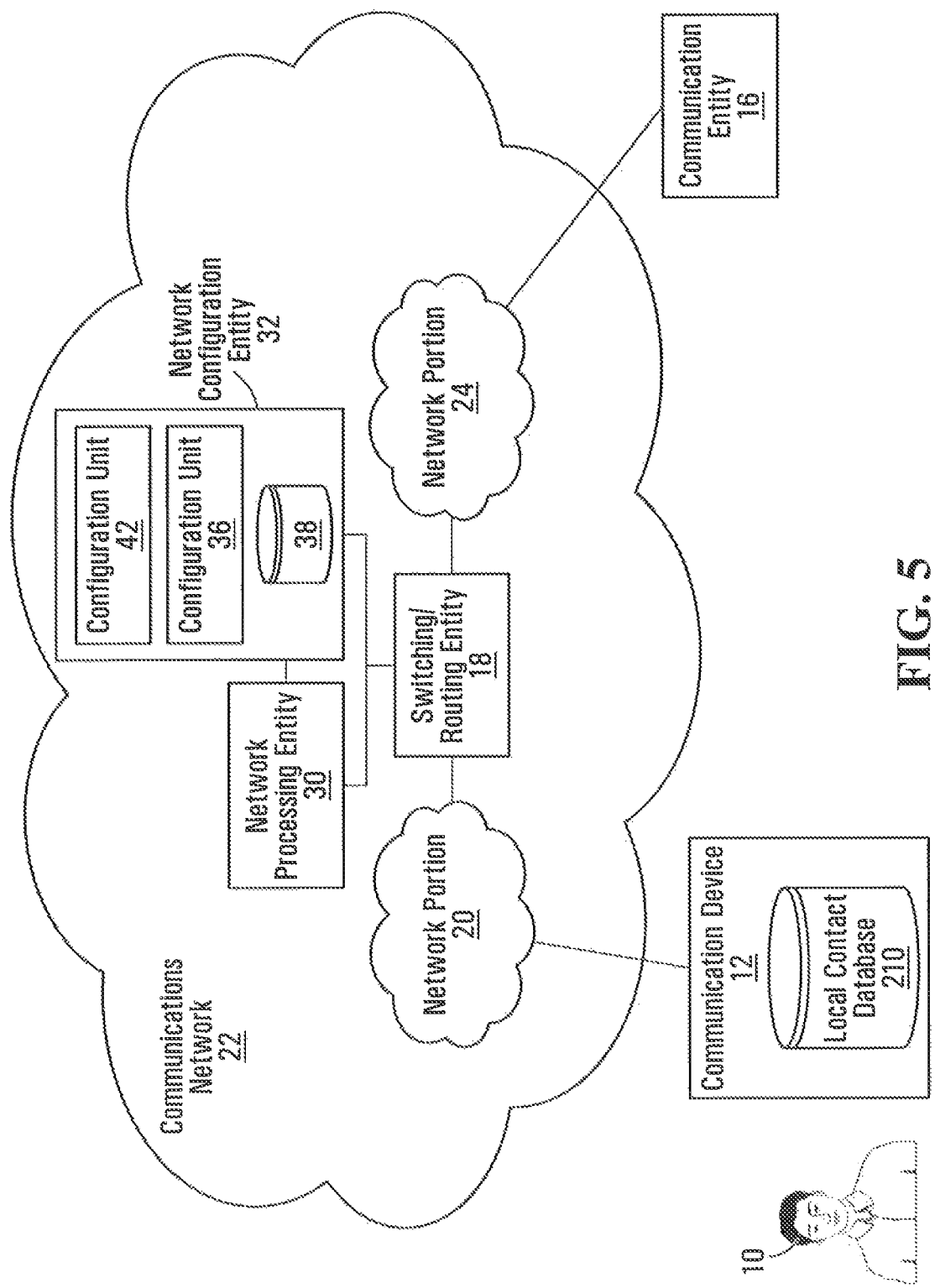
FIG. 5 illustrates a variant of the communications network shown in FIG. 1.

In the description provided above, the user's contact database $200_i$ is a network database that is stored within the data storage unit 26 of the communications network 22. It should be appreciated that in alternative embodiments, it is possible for the user's contact database to be stored locally within the user's communication device instead. Shown in FIG. 5 is an alternative non-limiting embodiment, wherein it is the user's communication device 12 that stores the user's contact database 210. Although not shown, in FIG. 5, included within the contact database 210 are a plurality of entries that each include contact information for a given one of the user's contacts.

In the case where the user's contact database 210 is stored locally within a user's communication device (such as communication device 12), the method described above is performed in the same way up to step 450. At step 450, when the configuration unit 36 has received from the user the information indicative of a desired modification to the user's contact database, the configuration unit 36 issues one or more signals containing configuration information to the communication device 12, for causing the communication device 12 to configure the user's contact database 210 in the appropriate manner. These one or more signals may include program instructions to be executed by the communication device 12, such that the communication device 12 causes the contact database 210 to be configured. Depending on the user's desired modifications, this configuration may involve modifying, adding and/or deleting one or more entries contained within the database 210 associated with the user 10.

In the example described above, the user 10 answered the previously-originated call originated by the communication entity 16, such that presumably, a conversation took place. It should, however, be appreciated that the term "previously-originated call" may not necessarily refer to only calls that were answered by the intended recipient of the call. Rather, the term "previously-originated call" may refer to a call that was missed by the intended recipient, or that went to voicemail. For example, the previously-originated call may not have been answered by the user 10 (e.g., it may have been missed or the user 10 may have decided not to answer it). In such circumstances, this attempted call will still be considered a "previously-originated call", and a record 300 will still be generated and stored in the memory 38 for this previously-originated call. In this manner, the user 10 may interact with the network configuration entity 32 at a later point in time as described above. Interaction between the user 10 and the network configuration entity 32 may then proceed as described above in connection with FIG. 4, such that a user can cause configuration of his/her contact database at least in part on the basis of contact information associated with the missed previously-originated call.

In the above described example, it was the user 10 of the communication device 12, (the called party) that interacted with the network configuration entity 32 in order to configure his/her contact database $200_i$. This configuration was done on the basis of contact information associated with the communication device 16 that originated the call. However, in an alternative embodiment, the communication entity 16 that originated the call (the calling party) can also interact with the network configuration entity 32 in order to configure his/her contact database (which for the sake of example will be database $200_j$ shown in FIG. 2). This configuration can be done on the basis of the contact information associated with the communication device 12 that received the call.

For example, assume that the user of the communication entity 16 originates a call to the communication device 12 so as to reach user 10. The user of the communication entity 16 may already have the phone number associated with communication device 12, but have no other contact information for user 10. When the user of the communication entity 16 originates the call to the communication device 12, a record 300 is generated and stored within the memory 38 of the network configuration entity 32. It is possible that the contact information that is stored in the called party information 304 portion of the record 300 includes more contact information than what the user of the communication entity 16 already has. For example, if the network processing entity 30 supplies information to the network configuration entity 32 from a subscriber account profile associated with the user 10 of the communication device 12, then it is possible for the record 300 associated with the previously-originated call to include more contact information associated with the user 10 than just the phone number for communication device 12.

As such, once the user of the communication entity 16 has originated the call, the user of communication entity 16 may interact with the network configuration entity 32 in the manner described above with respect to FIG. 4, in order to cause configuration of his/her contact database $200_j$. By so doing, the user of the communication entity 16 may obtain more contact information associated with the called party (user 10) than he/she previously had.

In light of the above, it should be appreciated that both the called party and/or the calling party involved in a previously-originated call can interact with the network configuration entity 32 in order to configure his/her contact database.

In accordance with an alternative example, the user 10 may use another communication device (not shown) instead of the communication device 12 in order to interact with the network configuration entity 32. In this situation, the user 10 may have to interact with the network configuration entity 32 in order to identify himself/herself. This may be effected by the user 10 speaking one or more utterances (possibly in response to one or more voice messages (e.g., questions) sent by the communication unit 42) and/or pressing on one or more buttons of his/her communication device (such as the communication device 12) or otherwise tactilely interacting therewith, so as to cause the other communication device to send to the network configuration entity 32 one or more signals conveying information that allows the network configuration entity 32 to identify the user 10. For example, this information may include a name or other party identifier associated with the user 10; authentication information (e.g., a password or voiceprint); and/or an identifier (e.g., a telephone number, IP address, or SIP URI) associated with the communication device 12, which can be determined as being associated with the user 10 by consultation of the databases $200_{1-m}$ or another memory unit (not shown) storing, for each of a plurality of parties (such as the user 10), information identifying a set of communication devices expected to be used by that party to effect telephonic communications. Based on this information, the network configuration entity 32 may proceed to identify the user 10 and may then proceed to identify the previously-originated call as described above. Interaction between the user 10 and the network configuration entity 32 may then proceed as described above in connection with FIG. 4.

Figure 6:
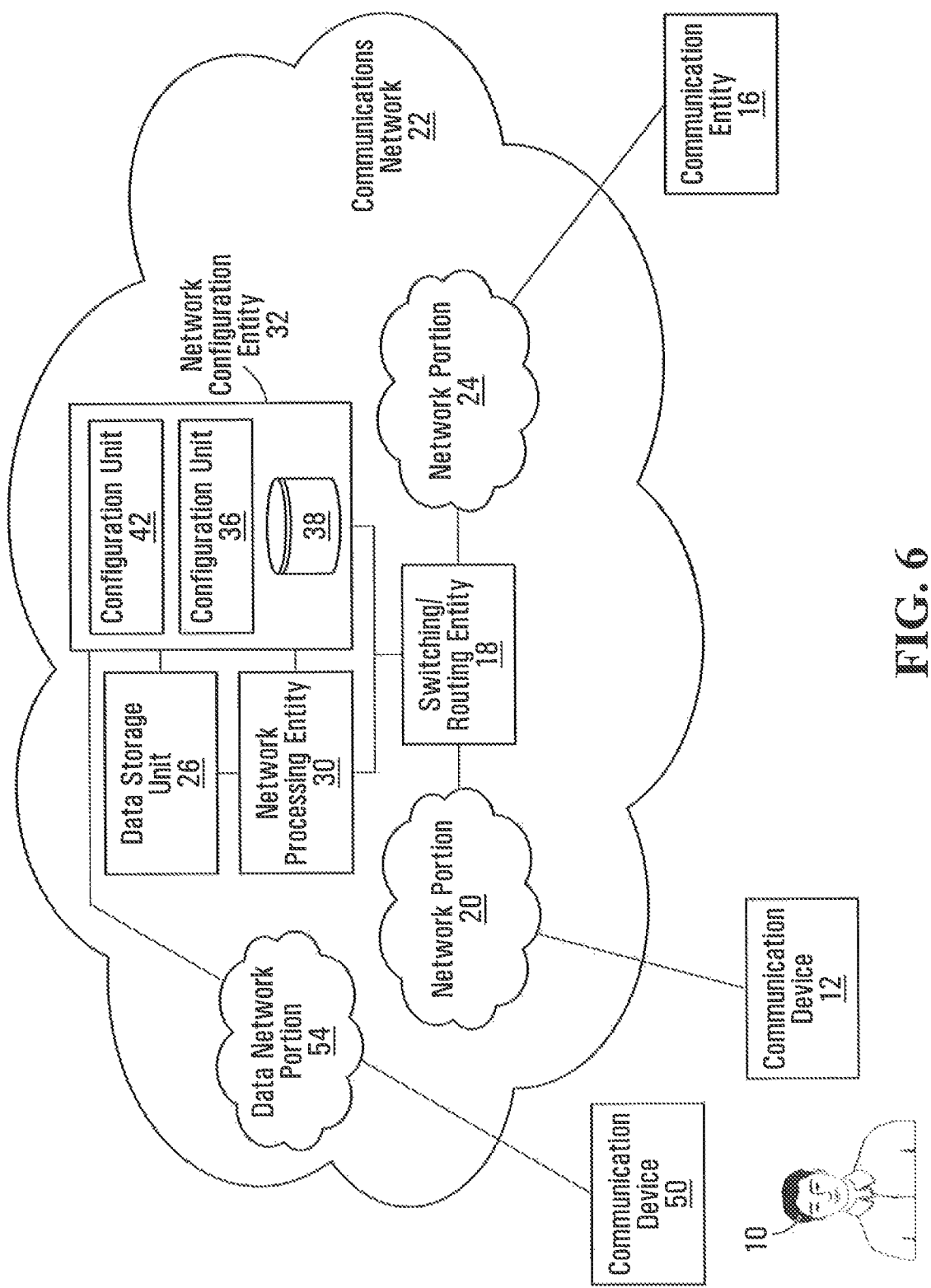
FIG. 6 illustrates a further variant of the communications network shown in FIG. 1.

Turning now to FIG. 6 there is shown an embodiment in which the user 10 may use a computing device 50 connected to a data network portion 54 of the communications network 22 in order to avail himself/herself of the address book configuration feature contemplated herein. For example, in various embodiments, the computing device 50 may be implemented as a personal computer (PC) such as a desktop computer, a laptop computer, a tablet PC, or a wireless PDA. In embodiments where the communication device 12 is a soft phone or a telephony-enabled PDA, the computing device 50 and the communication device 12 may be one and the same. The computing device 50 is provided with at least one input device such as a keyboard, a mouse, a touchscreen, a stylus, a microphone, etc., as well as a display and possibly one or more other output devices (e.g., a speaker) that enable interaction between the user 10 and the computing device 50. The computing device 50 runs a software application implementing a data network browser (e.g., a web browser) that the user 10 can interact with via the display and the at least one input device in order to access and interact with data network sites (e.g., web sites).

In this embodiment, the network configuration entity 32, and particularly the communication unit 42, implements a data network site (e.g., a web site) which the user 10 may access and interact with using the computing device 50. This data network site is hereinafter referred to as a "configuration site". The data network browser enables the computing device 50 to access and interact with the configuration site over the data network portion 54.

The configuration site allows a given party (such as the user 10) to use a data network browser implemented by a computing device (such as the data network browser implemented by the computing device 50) to conveniently and efficiently effect configuration of the user's contact database on a basis of contact information associated with a previously-originated call involving the user 10 and another party. This in effect allows the user 10 to indicate how his/her database should be configured or modified on the basis of contact information associated with the previously-originated call.

Figure 7:
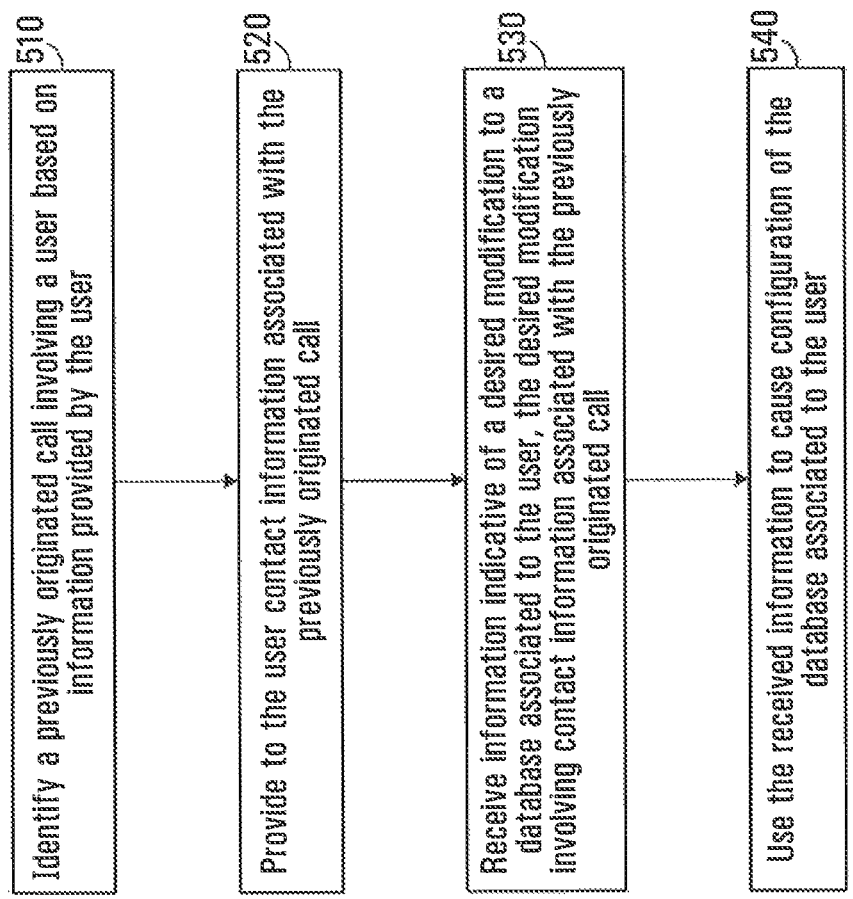
FIG. 7 illustrates an example of a process performed by the network configuration entity shown in FIG. 5.

With additional reference to FIG. 7, operation of the network configuration entity 32 and its interaction with the computing device 50 will now be illustrated in the context of the above-considered example in which a call previously-originated by the communication entity 16 passed through the switching/routing entity 18, was processed by the network processing entity 30 and ultimately reached the communication device 12, where it was answered by the user 10 and ended after a certain period of time (for instance, with the user 10 of the communication entity 16 hanging up). Once again, in describing this example, this call will sometimes be referred to as "the previously-originated call". It should also be appreciated that it could be the user of the communication entity 16 that uses the computing device 50 in order to access and interact with the network configuration entity 32.

In this case it is assumed that the user 10 does not use the communication device 12 to interact with the network configuration entity 32 right after the previously-originated call ends, but rather uses the computing device 50 to interact with the network configuration entity 32 at a later time, such as a few minutes, hours, or days after the call has ended. More particularly, the user 10 uses the computing device 50 to cause its data network browser to access and interact with the configuration site implemented by the network configuration entity 32. This may involve the user 10 going through a login process in order to access certain content of the configuration site, such as contact information associated with previously-originated calls involving the user 10.

Step 510

At step 510, the communication unit 42 identifies the previously-originated call.

More particularly, in this embodiment, the configuration site interacts with the data network browser of the computing device 50 to cause displaying on the display thereof of a graphical element associated with a list of one or more previously-originated calls involving the user 10 (i.e., one or more calls that have been previously-originated by the communication device 12 or another communication device associated with the user 10) or that have been previously received by the communication device 12 (or another communication device associated with the user 10). This list is established by the communication unit 42 accessing the memory unit 38 and locating one or more of the records 300₁-300ₚ that are associated with calls associated with the user 10. In some cases, for memory considerations, this list may be established so as to contain no more than a maximum number of previously-originated calls involving the user 10.

The graphical element associated with the list of one or more previously-originated calls involving the user 10 can take on many forms. For example, in one embodiment, the graphical element may convey the list itself by conveying, for each given previously-originated call of the list, information identifying the given previously-originated call, such as a telephone number or other identifier associated with an origin of the given previously-originated call, a telephone number or other identifier associated with an intended destination of the given previously-originated call, a time at which the given previously-originated call was originated, and/or other information that uniquely identifies the given previously-originated call. In another embodiment, the graphical element may be an actionable graphical element (e.g., a graphical button or hyperlink) that can be acted on by the user 10 in order to cause display (e.g., in a new graphical window or drop-down menu) of the aforementioned information identifying each given previously-originated call of the list of one or more previously-originated calls. It will be appreciated that the graphical element associated with the list of one or more previously-originated calls involving the user 10 may be implemented in various other manners in other embodiments.

Based on the information identifying each given previously-originated call of the list of one or more previously-originated calls associated with the displayed graphical element, the user 10 uses the at least one input device of the computing device 50 in order to select a particular one of these calls, namely the previously-originated call considered in this example. For example, the user 10 can use the at least one input device of the computing device 50 to click on or otherwise select an area of the display (e.g., a link, graphical button, or checkbox) corresponding to the previously-originated call in question. This selection by the user 10 causes transmission to the communication unit 42 of a signal indicative of the previously-originated call selected by the user 10.

Upon receiving the signal indicative of the previously-originated call selected by the user 10, the communication unit 42 identifies the previously-originated call.

Step 520

Having identified the previously-originated call, the communication unit 42 provides to the user 10 contact information associated with the previously-originated call. This contact information enables the user 10 to determine if and how he/she should configure his/her contact database.

The manner in which the contact information associated with the previously-originated call is provided to the user, may take on various forms. For instance, and with our previous assumption that only the contact information associated with the calling party (communication entity 16) is provided to the user 10, the contact information that is provided may include any, if not all, of the contact information stored in the calling party information 306 section of the previously-originated call record 300. For example, the contact information may include a name, one or more phone numbers, one or more fax numbers, one or more email addresses, CLID information, residential address information, etc. . . . . .

In order to provide to the user 10 the contact information associated with the previously-originated call, in this embodiment, the communication unit 42 retrieves from the particular one of the records 300₁-300ₚ associated with that call the contact information. The communication unit 42 proceeds to provide to the user 10 the contact information by virtue of the configuration site interacting with the data network browser of the computing device 50 to cause displaying on the display thereof text or other graphical elements that conveys the contact information.

In the case of a text display, the contact information may appear as follows:
Called you on Dec. 2, 2008 at 9:15 am
John Smith
Ph #: (515) 555-1234
Fax #: (515) 555-2345
Address: 3333 Mount Pleasant Rd, City, Country The above example of the manner in which the contact information regarding the previously-originated call is displayed, is presented for illustrative purposes only and is not to be considered limiting in any respect since the manner in which the information is displayed can be done in is variety of different ways without departing from the spirit of the invention.

Upon learning (or confirming his/her understanding of) the contact information associated with the previously-originated call, the user 10 may realize (or confirm) if and how his/her contact database should be configured on the basis of this contact information.

While it can be beneficial to the user 10 in some cases, this step of providing to the user 10 contact information associated with the previously-originated call is optional and may not be effected in certain embodiments.

Step 530

For purposes of this example, it is assumed that the user 10 desires to modify his/her contact database on the basis of the contact information associated with the previously-originated call.

Accordingly, the user 10 uses the at least one input device of the computing device 50 so as to cause the communication unit 42 to receive information indicative of a desired modification to the user's contact database. The desired modification involves the contact information associated with the previously-originated call. For example, the user 10 may use the at least one input device of the computing device 50 to enter one of the following desired modifications:

1) Add the contact information associated with the previously-originated call to the user's contact database.
2) Update the entry in the user's contact database associated with the contact information associated with the previously-originated call.
3) Remove the contact information associated with the previously-originated call from the user's database contact database.

The desired modification may be selected from a list of possible configuration options in a drop-down box, or other computer list, provided to the user via the computing device 50. By selecting one of the options at the computing device 50, a signal is sent to the communication unit 42 of the network configuration entity 32, such that the network configuration entity 32 receives information indicative of a desired modification to the user's contact database.

Step 540

Upon receiving the information indicative of the desired modification to the user's contact database, the configuration unit 36 uses this received information to cause configuration of the user's contact database 200ᵢ (which, in this case, is stored in the data storage unit 26 of the communications network 22). It should, however, be appreciated that the user's contact database could also be stored locally within one or more of the user's communication devices (such as communication device 12). In this embodiment, this configuration may involve adding, modifying and/or deleting one or more entries within the user's contact database.

In the case where the user 10 provided information indicative that the contact information associated with the previously-originated call should be added to the user's contact database, then the configuration unit 36 configures the user's contact database such that at least some of the contact information associated with the previously-originated call is added as a new entry $204_N$ within the user's contact database (which could be one of the databases $200_{1-M}$).

In the case where the user 10 provided information indicative that the contact database should be updated or modified on the basis of the contact information associated with the previously-originated call, then the configuration unit 36 configures the user's contact database such that at least one of the entries $204_{1-M}$ (and most likely the record that already contains information for that contact) is modified and/or updated.

In the case where the user 10 provided information indicative that the contact information associated with the previously-originated call should be removed from the user's contact database, then the configuration unit 36 configures the user's contact database such that some, if not all, of the contact information contained within an entry 204 associated with the contact information from the previously-originated call is removed from the user's contact database.

It is reiterated that the above example of configuration of entries within the user's contact database is presented for illustrative purposes only and is not to be considered limiting in any respect since such configuration depends on what the user 10 indicated should be performed.

It will thus be appreciated that, in this example, the network configuration entity 32, via its configuration site, enabled the user 10 to conveniently and efficiently effect configuration of a database associated with the user 10, on a basis of contact information associated with the previously-originated call.

It will further be appreciated that the network configuration entity 32 may be provided with other functionality to facilitate interaction of a party (such as the user 10) therewith.

For example, in some embodiments, the network configuration entity 32 may be operative to send and/or receive one or more electronic messages such as electronic mail (email) messages, instant messaging (IM) messages (including IM voice messages), or text messages (e.g., Short Messaging Service (SMS) or Multimedia Messaging Service (MMS) messages) to and/or from a communication device (such as the communication device 12) and/or a computing device (such as the computing device 50) associated with a party (such as the user 10). This possible functionality of the network configuration entity 32 will now be illustrated in the context of the above-considered example in which a call previously-originated by the communication entity 16 passed through the switching/routing entity 18, was processed by the call processing entity 30 and ultimately reached the communication device 12, where it was answered by the user 10 and ended after a certain period of time (for instance, with the user 10 or the party associated with the communication entity 16 hanging up). This call will be referred to as "the previously-originated call" and, for purposes of this examples, it is assumed that the user 10 does not use the communication device 12 to interact with the network configuration entity 32 right after the previously-originated call ends, but rather uses the communication device 12 and/or the computing device 50 to interact with the network configuration entity 32 at a later time, such as a few minutes, hours, or days after the call has ended.

Thus, in some embodiments, after the previously-originated call ends or while it is in progress, the communication unit 42 may send one or more electronic messages destined for the communication device 12 and/or the computing device 50. The communication unit 42 may obtain destination information for the one or more electronic messages by consulting the particular one of the databases $200_1$-$200_M$ that is associated with the user 10 or by consulting another memory unit (not shown) storing such information. Depending on its intended destination, each electronic message may be an email message, an IM message, or a text message and conveys an indication of an opportunity to provide information indicative of a desired modification to the user's contact database on the basis of contact information associated with the previously-originated call. For example, each electronic message may convey one or more of: information identifying the previously-originated call (e.g., obtained from the memory unit 38); contact information regarding the calling party or the called party of the previously-originated call (e.g., obtained from the memory unit 38); a hyperlink or a data network address associated with the configuration site implemented by the network configuration entity 32; an email address associated with the network configuration entity 32; and information indicative of an opportunity for the user 10 to provide information indicative of a desired modification to the user's contact database (e.g., "Click here if you would like to add the contact information to your address book,"; "Dial *12 if would you like to remove the contact information for the calling party from your address book."; etc.).

In these embodiments, transmission to the communication device 12 and/or the computing device 50 of the one or more electronic messages may be affected automatically by the communication unit 42, without requiring any input from the user 10. This automatic transmission may be affected by the communication unit 42 for any previously-originated call (such as the one under consideration in this example). Alternatively, the communication unit 42 may effect this automatic transmission for a given previously-originated call only when one or more conditions are satisfied. For example, the one or more conditions may be defined in terms of one or more characteristics of the given previously-originated call (e.g., if the contact information associated with given previously-originated call is not included within the called party's contact database, the communication unit 42 may proceed with effecting this automatic transmission).

As a possible alternative, in these embodiments, transmission to the communication device 12 and/or the computing device 50 of the one or more electronic messages may be effected by the communication unit 42 in response to receipt of an electronic message (e.g., an email, IM, or text message) requesting such transmission and originated by the communication device 12 or the computing device 50 as a result of interaction of the user 10 with that device.

Upon receipt of the one or more electronic messages at the communication device and/or the computing device 50, the user 10 may use the communication device 12 or the computing device 50 to interact with the network configuration entity 32 as previously described herein in order to effect configuration of call processing information associated with the user 10.

In a similar manner, in some embodiments, the user 10 may use the communication device 12 and/or the computing device 50 to cause transmission to the communication unit 42 of one or more electronic messages (e.g., email, IM, or text messages) conveying information identifying the previously-originated call and/or information indicative of a desired modification to the user's contact database. The desired modification involves contact information associated with the previously-originated call. In such embodiments, the communication unit 42 may identify the previously-originated call and/or determine how the user's contact database should be modified by processing the received one or more electronic messages.

Those skilled in the art will appreciate that, in some embodiments, certain functionality of a given component described herein (including the network configuration entity 32) may be implemented as pre-programmed hardware or firmware elements (e.g., application specific integrated circuits (ASICs), electrically erasable programmable read-only memories (EEPROMs), etc.) or other related elements. In other embodiments, a given component described herein (including the network configuration entity 32) may comprise a processor having access to a code memory which stores program instructions for operation of the processor to implement functionality of that given component. The program instructions may be stored on a medium which is fixed, tangible, and readable directly by the given component (e.g., removable diskette, CD-ROM, ROM, fixed disk, USB key, etc.). Alternatively, the program instructions may be stored remotely but transmittable to the given component via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A method implemented by a network entity, said method comprising:
   a. maintaining, on a computer readable storage medium in communication with the network entity, records associated with previously-originated calls involving a user, at least some records conveying contact information associated with the previously originated calls involving the user;
   b. through a user communication device associated with the user, eliciting from the user information expressing a desire to provide database modification information conveying a desired modification to a database associated with the user;
   c. in response to receipt at the network entity of specific database modification information conveying a specific desired modification to the database associated with the user:
      i. processing the records associated with previously-originated calls involving the user at least in part based on the specific database modification information to identify contact information associated with a specific previously-originated call, the specific previously-originated call corresponding to a specific record selected amongst the records in the computer readable storage medium in communication with the network entity, the specific database modification information being received at the network entity from the user communication device after termination of the specific previously-originated call, the user communication device being involved in the specific previously-originated call; and
      ii. causing the database associated with the user to be configured at least in part based on the specific desired modification and the contact information associated with the specific previously-originated call involving the user.

2. A method as defined in claim 1, wherein the database associated with the user is a local database stored at the user communication device.

3. A method as defined in claim 1, wherein the contact information is associated to a calling party involved in the specific previously-originated call.

4. A method as defined in claim 1, wherein the specific database modification information conveys a desire to add the contact information to the database associated with the user.

5. A method as defined in claim 4, wherein causing the database associated with the user to be configured comprises adding the contact information to the database associated with the user.

6. A method as defined in claim 1, wherein the specific database modification information conveys a desire to remove the contact information from the database associated with the user.

7. A method as defined in claim 6, wherein causing the database associated with the user to be configured comprises removing contact information from the database associated with the user.

8. A method as defined in claim 1, wherein the specific database modification information conveys a desire to update existing contact information in the database associated with the user at least in part based on the contact information associated with the specific previously-originated call.

9. A method as defined in claim 8, wherein causing the database associated with the user to be configured comprises updating existing contact information in the database at least in part based on the contact information associated with the specific previously-originated call.

10. A method as defined in claim 1, wherein the specific database modification information is received via a voice signal that is uttered into the user communication device.

11. A method as defined in claim 1, wherein the specific database modification information is received via DTMF signals entered into the user communication device.

12. A method as defined in claim 1, wherein the database associated with the user is a network database.

13. A method as defined in claim 1, wherein the contact information associated with the specific previously-originated call includes a name of a party involved in the specific previously-originated call and at least one of a phone number and an email address corresponding to the party.

14. A method as defined in claim 1, wherein identifying the contact information associated with the specific previously-originated call includes:
   a. receiving identification information enabling identification of the specific previously-originated call; and
   b. using the identification information to identify the specific previously-originated call.

15. A method as defined in claim 14, wherein using the identification information comprises consulting the database associated with the user to identify the specific previously-originated call.

16. A method as defined in claim 1, further comprising presenting to the user the contact information associated with the specific previously-originated call.

17. A method as defined in claim 16, wherein presenting to the user the contact information associated with the specific previously-originated call comprises causing at least one graphical element conveying the contact information to be displayed on the user communication device.

18. A method as defined in claim 16, wherein presenting to the user the contact information associated with the specific previously-originated call comprises causing transmission of at least one electronic message conveying the contact information to the user communication device.

19. A method as defined in claim 18, wherein the at least one electronic message is one of an email message, an instant messaging message, and a text message.

20. A method as defined in claim 1, wherein said eliciting comprises causing transmission of a voice message to the communication device associated with the user, the voice message eliciting from the user the information expressing the desire to provide database modification information.

21. A method as claimed in claim 1, wherein said eliciting comprises causing transmission of a signal to cause display of at least one graphical element on the communication device associated with the user, the at least one graphical element eliciting from the user the information expressing the desire to provide database modification information.

22. A network configuration entity comprising:
 a. a communication unit operative for:
  i. transmitting data to a user communication device associated with a user to elicit from the user information expressing a desire to provide database modification information conveying a desired modification to a database associated with the user;
  ii. in response to receipt of specific database modification information conveying a specific desired modification to the database associated with the user, processing a set of records associated with previously-originated calls involving the user at least in part based on the specific modification information to identify contact information associated with a specific previously-originated call, the specific previously-originated call corresponding to a specific record selected amongst the set of records associated with previously-originated calls involving the user, the specific database modification information being received from the user communication device after termination of the specific previously-originated call, the user communication device being involved in the specific previously-originated call;
 b. a configuration unit operative for causing the database associated with the user to be configured at least in part based on the specific desired modification and the contact information associated with the specific previously-originated call involving the user.

23. A network configuration entity as defined in claim 22, wherein the database associated with the user is a local database stored at the user communication device.

24. A network configuration entity as defined in claim 22, wherein the contact information is associated to a calling party involved in the specific previously-originated call.

25. A network configuration entity as defined in claim 22, wherein the specific database modification information conveys a desire to add the contact information to the database associated with the user.

26. A network configuration entity as defined in claim 25, wherein said configuration unit is operative for causing the contact information to be added to the database associated with the user.

27. A network configuration entity as defined in claim 22, wherein the specific database modification information conveys a desire to remove the contact information from the database associated with the user.

28. A network configuration entity as defined in claim 27, wherein said configuration unit is operative for causing the contact information to be removed from the database associated with the user.

29. A network configuration entity as defined in claim 22, wherein the specific database modification information conveys a desire to update existing contact information in the database associated with the user based at least in part on the contact information associated with the specific previously-originated call.

30. A network configuration entity as defined in claim 29, wherein said configuration unit is operative for updating existing contact information in the database based on the contact information associated with the specific previously-originated call.

31. A network configuration entity as defined in claim 22, wherein the specific database modification information is received via a voice signal that is uttered into the user communication device.

32. A network configuration entity as defined in claim 22, wherein the specific database modification information is received via DTMF signals entered into the user communication device.

33. A network configuration entity as defined in claim 22, wherein the database associated with the user is a network database.

34. A network configuration entity as defined in claim 22, wherein the contact information associated with the specific previously-originated call includes a name of a party involved in the specific previously-originated call and at least one of a phone number and an email address corresponding to the party.

35. A network configuration entity as defined in claim 22, wherein the communication unit is further operative for presenting to the user the contact information associated with the specific previously-originated call.

36. A network configuration entity as defined in claim 35, wherein presenting to the user the contact information associated with the specific previously-originated call comprises causing at least one graphical element conveying the contact information to be displayed on the user communication device.

37. A network configuration entity as defined in claim 35, wherein presenting to the user the contact information associated with the specific previously-originated call comprises causing transmission of at least one electronic message conveying the contact information to the communication device.

38. A network configuration entity as defined in claim 37, wherein the at least one electronic message is one of an email message, an instant messaging message, and a text message.

39. A network configuration entity as defined in claim 22, wherein said eliciting comprises causing transmission of a voice message to the user communication device eliciting from the user the information expressing the desire to provide database modification information.

40. A network configuration entity as defined in claim 22, wherein said eliciting comprises causing transmission of a signal to cause display of at least one graphical element on the communication device associated with the user, the at least one graphical element eliciting from the user the information expressing the desire to provide database modification information.

41. A system, comprising:
 a. a database associated with a user, said database including a set of entries, each entry comprising contact information associated with a respective contactable entity; and
 b. a network configuration entity comprising:

i. a communication unit operative for:
   1. transmitting data to a user communication device associated with the user to elicit from the user information expressing a desire to provide database modification information conveying a desired modification to the database associated with the user;
   2. in response to receipt of specific database modification information conveying a specific desired modification to the database associated with the user, processing a set of records associated with previously-originated calls involving the user at least in part based on the specific modification information to identify contact information associated with a specific previously-originated call, the specific previously-originated call corresponding to a specific record selected amongst the set of records associated with previously-originated calls involving the user, the specific database modification information being received from the user communication device after termination of the specific previously-originated call, the user communication device being involved in the specific previously-originated call;
ii. a configuration unit operative for causing the database associated with the user to be configured at least in part based on the specific desired modification and the contact information associated with the specific previously-originated call involving the user.

* * * * *